United States Patent [19]

Chiampas et al.

[11] Patent Number: 4,680,495
[45] Date of Patent: Jul. 14, 1987

[54] SPARK PROTECTED ALTERNATOR

[75] Inventors: George E. Chiampas, Chicago; John P. Finnegan, West Chicago, both of Ill.; Henry Villegas, Buffalo, N.Y.

[73] Assignee: Motorola, Inc., Schaumburg, Ill.

[21] Appl. No.: 863,665

[22] Filed: May 15, 1986

[51] Int. Cl.[4] .................. H02K 5/136; H02K 5/14
[52] U.S. Cl. .................. 310/220; 310/68 D; 310/239; 310/88
[58] Field of Search .......... 310/68 R, 68 D, 85, 310/88, 89, 220, 238, 239, 242, 245, 247, 71

[56] References Cited

U.S. PATENT DOCUMENTS

| 3,233,130 | 2/1966 | Bates | 310/88 |
| 3,283,186 | 11/1966 | Perry | 310/239 |
| 3,609,428 | 9/1971 | Cotton | 310/68 D |
| 4,169,282 | 9/1979 | Allport et al. | 310/68 D |

FOREIGN PATENT DOCUMENTS 3026460 2/1982 Fed. Rep. of Germany ... 310/68 D

Primary Examiner—Patrick R. Salce
Assistant Examiner—D. L. Rebsch
Attorney, Agent, or Firm—Phillip H. Melamed

[57] ABSTRACT

A spark-protected alternator has an external cavity on an end plate of the alternator housing with commutating (slip) rings on an alternator shaft extension and mating metal brushes positioned within the external cavity. The external cavity is effectively sealed from ambient atmosphere surrounding the alternator, to provide protection from sparks generated between the brushes and commutating rings wherein a minimum area of the housing end plate is utilized. Integral extensions of the end plate form side walls of the external cavity that partially radially surround the shaft extension and commutating rings. A brush holder in which the brushes are attached has projections which mate with slots in the side walls to radially close the external cavity, and an end cap (including a gasket) closes an open end of the external cavity, while the end plate effectively closes the other end of the external cavity. The brush holder forms part of the walls that close the external cavity, and this minimizes the size of the external cavity required to seal the commutating rings and brushes from the ambient atmosphere.

10 Claims, 2 Drawing Figures

SPARK PROTECTED ALTERNATOR

BACKGROUND OF THE INVENTION

The present invention is related to alternators/electric machines, and is more specifically related to spark protected alternators in which the interface between commutating rings and brushes is effectively isolated from the ambient atmosphere surrounding the alternator.

It is known that some alternators must be operable in potentially explosive ambient atmospheres. However, spark problems exist for alternators which utilize conventional construction in which commutating (slip) rings on an alternator shaft mate with associated brushes so as to apply excitation to a rotor assembly on the shaft. In such conventional alternators sparks may occur due to the electrical and mechanical contacts formed between the brushes and the commutating rings. In prior spark protected alternators, the solution was to provide a total sealed external cavity for enclosing the commutating rings and the entire brush assembly. The brush assembly includes the brushes and the brush holder to which the brushes are attached. The external cavity was adjacent to an end plate of the alternator housing and was typically separate from an interior alternator housing cavity in which the rotor and stator assemblies were located. Generally the voltage regulator for the alternator was also in this sealed external cavity.

The prior art sealed external cavity, besides providing spark protection, also provided dust protection for the brush to the commutating ring connection, as well as for other alternator components. The sealed external cavity was formed by either a solid cup-shaped end cap which was placed over an end plate of the alternator housing, or a flat end cap plate which mated with extending side walls of the alternator housing which formed the side walls of the external cavity. In either case, efficiently sealing this large external cavity proved difficult and expensive since any leakage around the perimeter of this large cavity could result in a catastrophic explosion if the alternator were operated in an explosive ambient atmosphere. In addition, providing extensions of the alternator housing to form the majority of the side walls forming this external cavity, while minimizing some potential leakage problems of the cavity to the ambient atmosphere, greatly increased the weight of the alternator since typically the alternator housing comprises heavy cast metal components.

In addition to the above deficiencies of the prior art, providing a large external cavity adjacent to the alternator end plate for the brush and commutating ring assemblies typically utilized a substantial amount of area of the alternator end plate. Most alternators rely on air cooling of the voltage regulator, the rectifier diodes and the rotor and stator assemblies. Utilizing a large external sealed cavity adjacent to the alternator end plate reduced the cooling efficiency of these alternators since the cavity prevented having extensive air ventilation holes in the end plate, and since the regulator and diodes were typically positioned in the sealed cavity. These factors reduced the power rating of these alternators. Therefore, in order to produce spark protected and nonspark protected alternators having the same maximum power output rating there were extensive differences in alternator designs for spark protected and nonspark protected alternators having the same power rating. This prevented use of a standard design and, therefore, increased alternator cost.

SUMMARY OF THE INVENTION

An object of the present invention is to provide an improved protected alternator/electric machine which overcomes the above noted deficiencies.

An additional object of the present invention is to provide an improved alternator in which a minimum volume external sealed cavity is provided for sealing the brushes and commutating rings of an alternator.

In one embodiment of the present invention, an improved alternator/electic machine is provided that has a housing for effectively encasing at least a rotor within an internal cavity formed by the housing. The alternator includes a shaft rotatable about an axis with the rotor mounted to the shaft and within the housing. The shaft rotatably passes through an end plate of the housing with an extension of the shaft from the end plate being located external to the internal cavity. Commutating rings which are connected to the rotor assembly are mounted on the shaft extension and mate with metal brushes attached to an insulating brush holder fixed to said housing. The brush holder and brushes together form a brush assembly means. The end plate of the housing has integral extensions thereof which form side walls of an external cavity that is external to the internal cavity of the alternator. The side walls partially radially, with respect to the shaft axis, surround the shaft extension and commutating rings while the external cavity has one axial end effectively closed by the end plate and an open axial end. The brush holder has projections/slots therein which effectively mate with slots/projections in the side walls to radially close the external cavity with the brush holder. An end cap is fixed to the housing and effectively closes the open end of the external cavity with respect to ambient atmosphere surrounding the housing. This structure results in the end plate, end cap, and brush holder and side walls together effectively sealing the external cavity and thereby effectively isolating sparks produced within this cavity from the ambient atmosphere surrounding the housing.

Essentially, the present invention minimizes the size (volume) of the sealed external cavity, in which the brushes and the commutating rings are located, by utilizing the brush holder to form part of the side walls that form the external cavity. This eliminates the need for having the external cavity encompass not only the commutating rings and brushes, but also the brush holder. By minimizing the external cavity volume, a more reliable seal of this cavity can be obtained by the end cap since a smaller perimeter of the external cavity would now have to be sealed. The mating projections and slots form a labyrinth path which spark seals the external cavity. Minimizing the volume of the external cavity also permits utilization of portions of the end plate external to the external cavity to have ventilation holes therein to provide air ventilation for alternator components positioned within the internal cavity of the alternator.

Minimizing the volume of the external cavity reduces alternator weight since less alternator housing material is required to form the side walls of the external cavity wherein the alternator housing material is typically cast metal. Also, the mating of the projections/slots of the brush holder with the slots/projections of the side walls provides a convenient mechanism for properly locating the brush holder and brushes with respect to the alternator housing. The alternator housing end plate effectively seals one end of the external cavity by providing a bearing therein for the alternator shaft wherein close contact between the bearing and shaft prevents escape of spark from the external cavity through the end plate. The open axial end of the external cavity is effectively sealed by the end plate which comprises a gasket and a plastic end plate which may have extensions beyond the radial boundaries of the external cavity so as to provide mechanical protection for additional components, such as the voltage regulator and/or rectifying diodes. These additional components may now be mounted on the end plate external to the alternator external cavity. Also, providing the regulator and diodes external to the sealed external cavity permits air cooling of these components.

These and other additional advantages and features of the present invention can best be understood by reference to the following description of the present invention.

BRIEF DESCRIPTION OF THE DRAWINGS

For a more complete understanding of the present invention, reference should be made to the drawings in which.

DESCRIPTION OF THE PREFERRED EMBODIMENTS OF THE INVENTION

Figure 1:
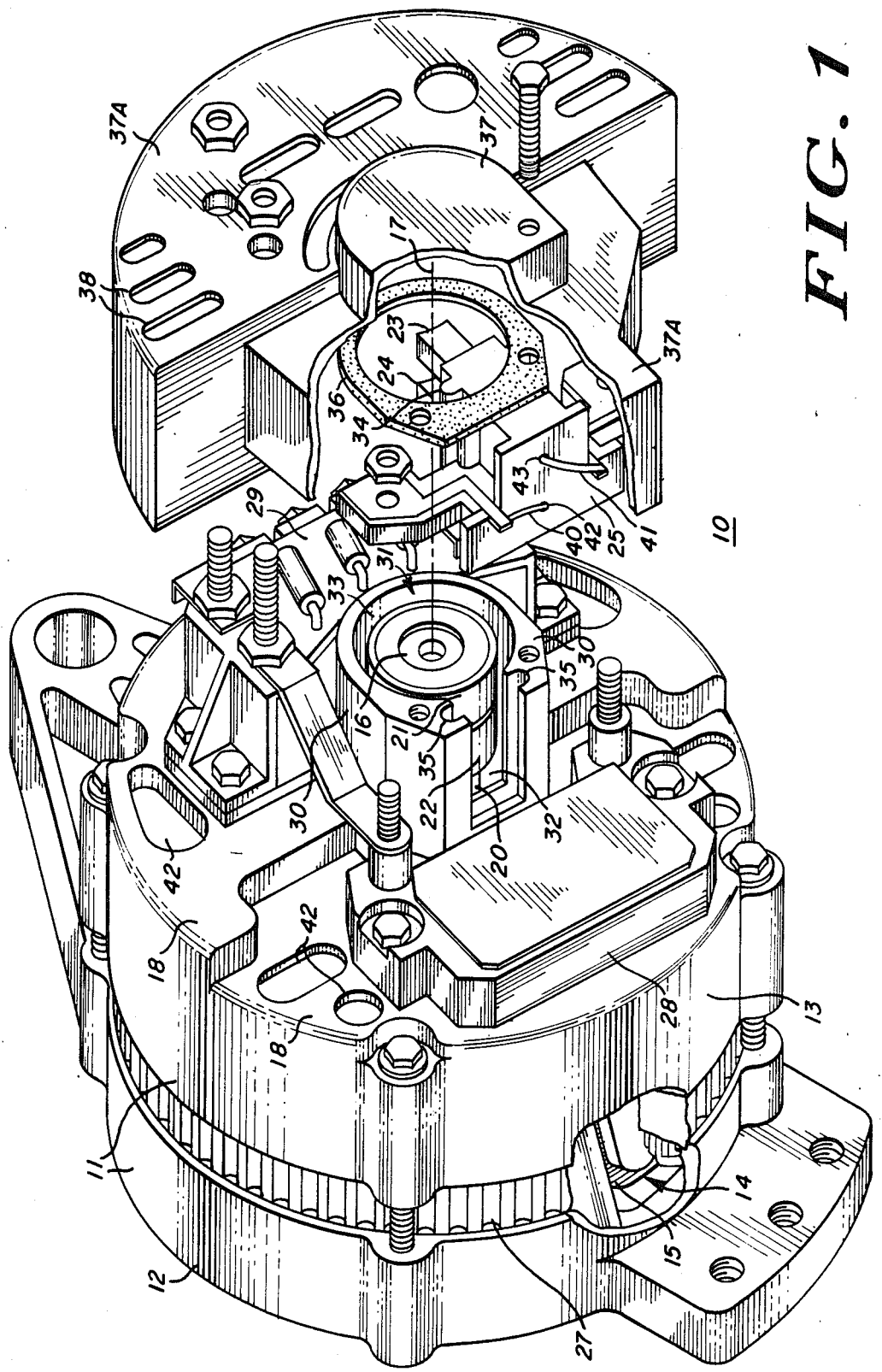
FIG. 1 is a partially exploded assembly perspective view of an alternator constructed in accordance with the present invention.

Referring to FIG. 1, an alternator 10 is shown in partial exploded assembly form. Preferably, the alternator comprises a spark protected alternator in which sparks that may be generated by the alternator are effectively isolated from the ambient atmosphere that surrounds the alternator. These sparks typically occur at the interface between metallic brushes and commutating (slip) rings on an alternator shaft. The brushes generally comprise metal impregnated carbon, but are referred to herein as metal brushes. The alternator 10 basically comprises an alternator housing 11 which comprises front and rear housing portions 12 and 13, respectively, each of which has a general cup-shaped configuration. When the front and rear housing portions are joined together, they form an internal cavity 14 so as to effectively encase a rotor 15 positioned in the internal cavity 14 and within the housing 11. An alternator shaft 16 is provided and is rotatable about an axis 17. The rotor 15 is mounted to the shaft within the housing 11, and the shaft rotatably passes through an end plate 18 of the rear housing portion 13. Preferably, both the front and rear housing portions are formed of cast metal with the end plate 18 being integral with rear housing portion 13.

Figure 2:
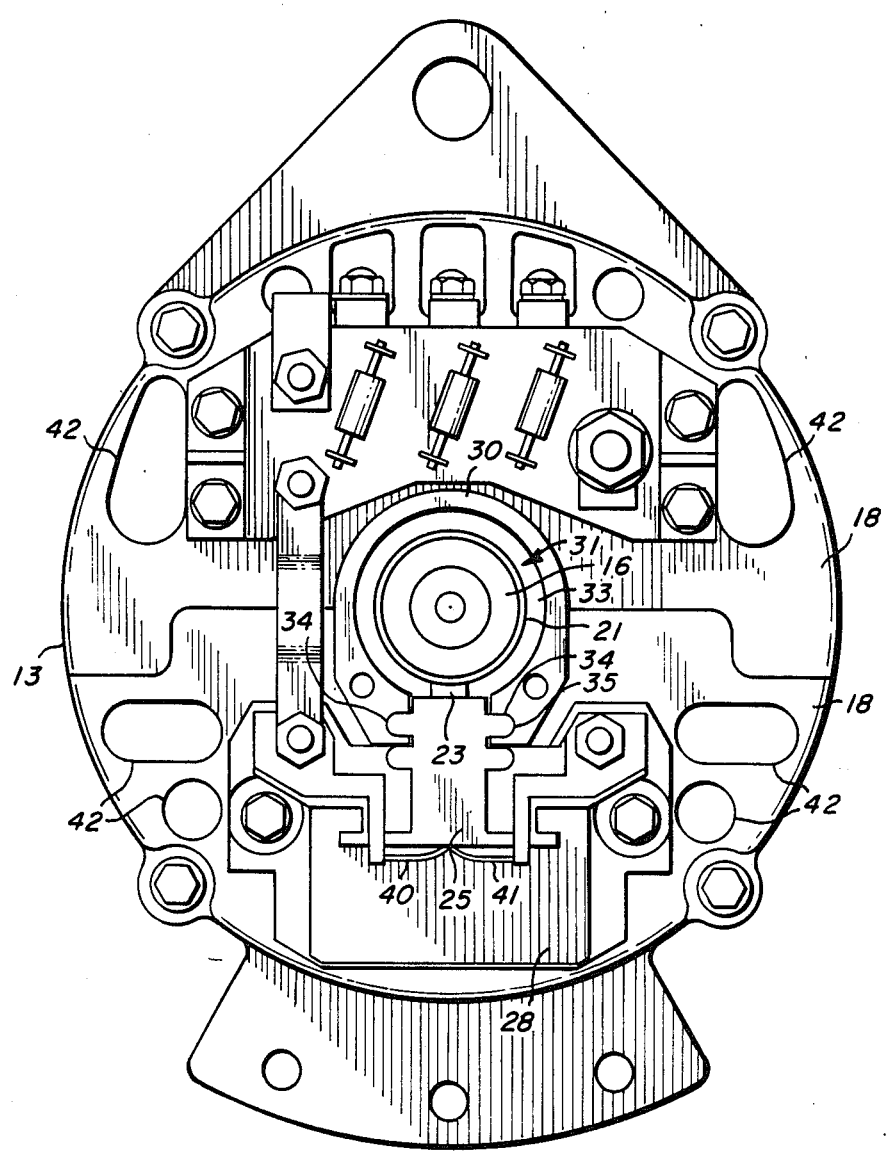
FIG. 2 is a top planar view of the alternator shown in FIG. 1 after partial assembly.

The alternator shaft 16 has a shaft extension 20 which is an integral portion of the shaft 16 and extends from the end plate 18 with the shaft extension being located external to the internal cavity 14. Two commutating (slip) rings 21 and 22 are fixed to the shaft extension 20 and are electrically connected to the rotor 15. As is typical, electrical excitation is provided to the rotor 15 by mechanical and electrical connections made to the commutating rings 21 and 22 by separate associated brushes 23 and 24. The brushes 23 and 24 are attached to an insulating brush holder 25 and are spring biased in the brush holder such that after assembly of the alternator, the brushes are biased into mechanical, and, therefore, electrical, contact with the commutating rings. FIG. 2 shows the brush holder 25 and brushes 23 and 24 after attachment of these parts to the alternator housing end plate 18. After assembly, the brushes 23 and 24 effectively mate with the commutating rings 21 and 22, respectively, and provide the mechanism by which electrical excitation is provided to the rotor 15 while the shaft 16 is rotating. Mounted in the end plate 18, and forming an effective part thereof, is a bearing assembly (not shown) for the alternator shaft 16. The close fit provided between the alternator shaft 16 and the bearing assembly means that there is an effective seal in the end plate 20 such that no path between the internal cavity 14 and the ambient atmosphere surrounding the alternator is provided by virtue of the alternator shaft 16 passing through the end plate 20.

A stator 27 is provided within the internal cavity 14 of the alternator with the stator provided for magnetic cooperation with the rotor 15. Other electrical components of the alternator 10 are provided on the end plate 18, but are located external to both the internal cavity 14 and a sealed external cavity 31. Some of these electrical components comprise a voltage regulator 28 and a diode bridge rectifier assembly 29 comprising rectifier diodes.

The end plate 18 of the housing has integral extensions thereof which form side walls 30 of the external cavity 31 that is positioned external to the internal cavity 14. The side walls 30 partially radially, with respect to the alternator shaft axis 17, surround the shaft extension 20 and the commutating rings 21 and 22 mounted thereon. This external cavity 31 essentially has one axial end 32 that is effectively closed by the end plate 18, the bearing assembly and the alternator shaft 16, all taken together. The external cavity 31 also has an open axial end 33. It should be noted that the terms radial and axial are utilized herein to describe various orientations with respect to the axis of rotation 17 of the alternator shaft 16.

The brush holder 25 has projections 34 therein which effectively mate with slots 35 in the side walls 30 such that after assembly, the brush holder 25 effectively radially closes the external cavity 31 such that the commutating rings 21 and 22 and the brushes 23 and 24 are radially enclosed within the cavity 31. Of course, it should be noted that while the present figures show the brush holder as including projections 34 and the side walls as including slots 35, these elements could be reversed with the brush holder utilizing slots and the side walls utilizing projections.

A gasket 36 and an end cap 37 together form an end cap means which is fixed to the housing 11 and effectively closes the open axial end 33 of the external cavity 31 with respect to ambient atmosphere surrounding the alternator housing. Preferably, the end cap 37 has radial extension portions 37A that radially extend, with respect to the shaft axis 17, beyond the external cavity 31 and provide mechanical protection for the diode bridge rectifier assembly 29 and the voltage regulator 28, both of which are located external to the external cavity 31. The end cap 37 also has openings 38 therein to provide for air ventilation of the diode bridge rectifier assembly 29 to assist in cooling this component.

Electrical wire connections 40 and 41 are provided to each of the brushes 23 and 24, respectively, and these wire connections are connected to the voltage regulator at points outside of the external cavity 31. The wires 40 and 41 exit the brush holder 25 through openings 42 and 43. The exit openings 42 and 43 are intentionally made small to minimize the possibility of spark leakage through these openings.

A key feature of the present invention is that the volume of the external cavity 31 is minimized by the present invention construction. This results from using the brush holder 25 to radially close the external cavity 31. A smaller sealed external cavity 31 means that the sealing of the external cavity 31 can be more efficient and reliable since a smaller perimeter of the external cavity 31 must now be sealed. This sealing of the external cavity, in addition to sealing created by the combination of the end plate 18, the bearing assembly and the alternator shaft 16, is essentially accomplished by the gasket 36 and end cap 37, in addition to an effective labyrinth seal provided by the projections 34 of the brush holder in cooperation with the slots 35 of the side walls 30. It should be noted that the labyrinth seal provided by the present invention has been found to provide an effective spark protection seal for sparks generated at the interface between the brushes and the commutating rings. In other words, sparks do not radially escape from the external cavity 31 since they must travel around the labyrinth path provided by the projections 34 and slots 35.

Reducing the size of the cavity 31 also means that the weight of the alternator is reduced since less material is required to construct the side walls 30. In addition, providing the projections 34 and slots 35 aid in properly locating the brush holder 25 with respect to the alternator housing 11 wherein it should, of course, be noted that in assembling the alternator 10, the brush assembly comprising the brush holder and brushes is assembled after the commutating rings and shaft extension are provided in the external cavity. The assembly of the alternator 10 is assisted by having the projections 34 and slots 35 essentially longitudinally oriented in directions parallel to the axis 17.

An additional advantage obtained by utilizing less volume for the external cavity 31 is that additional area on the end plate 18 is now available for cooling vent openings 42 in the end plate wherein these openings can be utilized to provide air cooling of the rotor and stator assemblies in the internal cavity 14.

It should be noted that even if spark protection for the alternator 10 is not desired or necessary, the present described construction still provides a minimum volume external cavity 31 which assists in sealing the interface between the commutating rings and brushes from external ambient atmosphere. Thus, dust particle contamination which may adversely affect the contact formed between the brushes and commutating rings is minimized by the present construction, while air cooling of the remaining alternator components can still be provided. Also, substantially identical alternator construction can be used for spark protected or nonspark protected alternators having the same maximum power rating, without settling for an inefficient nonspark protected alternator design.

While the present invention has been specifically described in terms of an improved alternator, features of the present invention are also applicable to other electric machines, such as generators and motors, which utilize brushes and commutating (slip) rings.

While specific embodiments of the present invention have been shown and described, further modifications and improvements will occur to those skilled in the art. All such modifications which retain the basic underlying principles disclosed and claimed herein are within the scope of this invention.

We claim:

1. An alternator/electric machine comprising:
    a housing for effectively encasing at least a rotor within an internal cavity formed by said housing;
    a shaft rotatable about an axis, said rotor mounted to said shaft within said housing, said shaft rotatably passing through a fixed end plate of said housing and having an extension of said shaft from said end plate being external to said internal cavity;
    commutating (slip) rings connected to said rotor and mounted on said shaft extension;
    brush assembly means comprising an insulating brush holder fixed to said housing and having metal brushes attached to the brush holder which mate with said commutating rings;
    said end plate having integral extensions thereof which form side walls of an external cavity external to said internal cavity, said side walls partially radially, with respect to said axis, surrounding said shaft extension and commutating rings, said external cavity having one axial end effectively closed by said end plate and an open axial end;
    one of said brush holder and said side walls having projections therein which mate with slots in the other one of said brush holder and said side walls to radially close said external cavity with said brush holder, a portion of said brush holder positioned radially external to said external cavity and providing electrical access to said brushes; and
    end cap means fixed to said housing to effectively close said open axial end of said external cavity with respect to ambient atmosphere surrounding said housing, wherein said end plate and end cap means, together with said brush holder and side walls, effectively isolate said external cavity from ambient atmosphere surrounding the housing, and wherein said projections and slots provide a fixed labyrinth seal for effectively isolating said external cavity from ambient atmosphere surrounding the housing.

2. An alternator/electric machine according to claim 1 wherein said brushes are spring-bias mounted in said brush holder, and each of said brushes has an electrical connection extending from said brush holder external to said external cavity.

3. An alternator/electric machine according to claim 2 wherein said projections and said slots are essentially longitudinally oriented parallel to said shaft axis.

4. An alternator/electric machine according to claim 3 wherein said side walls extend from said end plate in a direction essentially parallel to said shaft axis and effectively form a partial cylinder partially radially surrounding said shaft extension and commutating rings.

5. An alternator/electric machine according to claim 4 wherein said brush holder and said brushes effectively radially close said cylinder.

6. An alternator/electric machine according to claim 5 wherein said end cap means, in addition to effectively closing said open axial end of said external cavity, has extensions thereof radially beyond the external cavity with said extensions providing mechanical protection for electrical components mounted to said end plate and external to said internal cavity and external to said external cavity.

7. An alternator/electric machine according to claim 6 wherein said electrical components include at least a diode bridge rectifier assembly mounted to said housing external to said external cavity and electrically connected to a stator assembly having a stator winding positioned within said internal cavity.

8. An alternator/electric machine according to claim 7 wherein said extensions of said end cap means have openings therein to the ambient atmosphere surrounding the housing to provide ventilation for said electrical components.

9. An alternator/electric machine according to claim 3 wherein said projections comprise a pair of projections, each projection of said pair being received in an associated one of said slots.

10. An alternator/electric machine according to claim 1 wherein said fixed end cap is located axially beyond the shaft extension from the end plate.

* * * * *